(12) United States Patent
Nakamura et al.

(10) Patent No.: US 6,829,136 B2
(45) Date of Patent: Dec. 7, 2004

(54) DIELECTRIC CERAMIC, METHOD FOR MAKING THE SAME, AND MONOLITHIC CERAMIC CAPACITOR

(75) Inventors: Tomoyuki Nakamura, Omihachiman (JP); Hiroyasu Konakaka, Kusatsu (JP); Harunobu Sano, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/704,831

(22) Filed: Nov. 12, 2003

(65) Prior Publication Data

US 2004/0105214 A1 Jun. 3, 2004

(30) Foreign Application Priority Data

Nov. 29, 2002 (JP) ........................................ 2002-347269

(51) Int. Cl.[7] .............................. H01G 4/06; H01G 4/30
(52) U.S. Cl. ................................ 361/321.2; 361/321.5; 501/138
(58) Field of Search .............. 361/311–313, 321.1–321, 361/322; 501/134–139

(56) References Cited

U.S. PATENT DOCUMENTS 6,002,577 A * 12/1999 Wada et al. ................. 361/312
6,385,035 B1 * 5/2002 Matoba et al. ........... 361/321.1
6,437,970 B1 * 8/2002 Lee et al. .................... 361/311

FOREIGN PATENT DOCUMENTS

| JP | 05-009066 | 1/1993 |
|---|---|---|
| JP | 05-009067 | 1/1993 |
| JP | 05-009068 | 1/1993 |
| JP | 06-005460 | 1/1994 |
| JP | 09-270366 | 10/1997 |
| JP | 2001-220224 | 8/2001 |
| JP | 2001-230148 | 8/2001 |
| JP | 2001-230149 | 8/2001 |
| JP | 2001-313225 | 11/2001 |
| JP | 2003-077754 | 3/2003 |

* cited by examiner

*Primary Examiner*—Anthony Dinkins
(74) *Attorney, Agent, or Firm*—Dickstein, Shapiro, Morin & Oshinsky, LLP.

(57) ABSTRACT

A dielectric ceramic is composed of $ABO_3$ as the main component and a rare earth element, wherein A represents barium which may be partly replaced with at least one of calcium and strontium, and B represents titanium which may be partly replaced with at least one selected from zirconium and hafnium. At least 70% of crystal grains of the dielectric ceramic have a cross-section in which a first region containing dissolved rare earth element occupies 5 to 70% of the area of the cross section and a second region free of the dissolved rare earth element occupies 10 to 80% of the periphery of the cross-section. A monolithic ceramic capacitor having thin dielectric ceramic layers composed of this dielectric ceramic exhibits superior capacitance-temperature characteristics and high reliability.

20 Claims, 3 Drawing Sheets

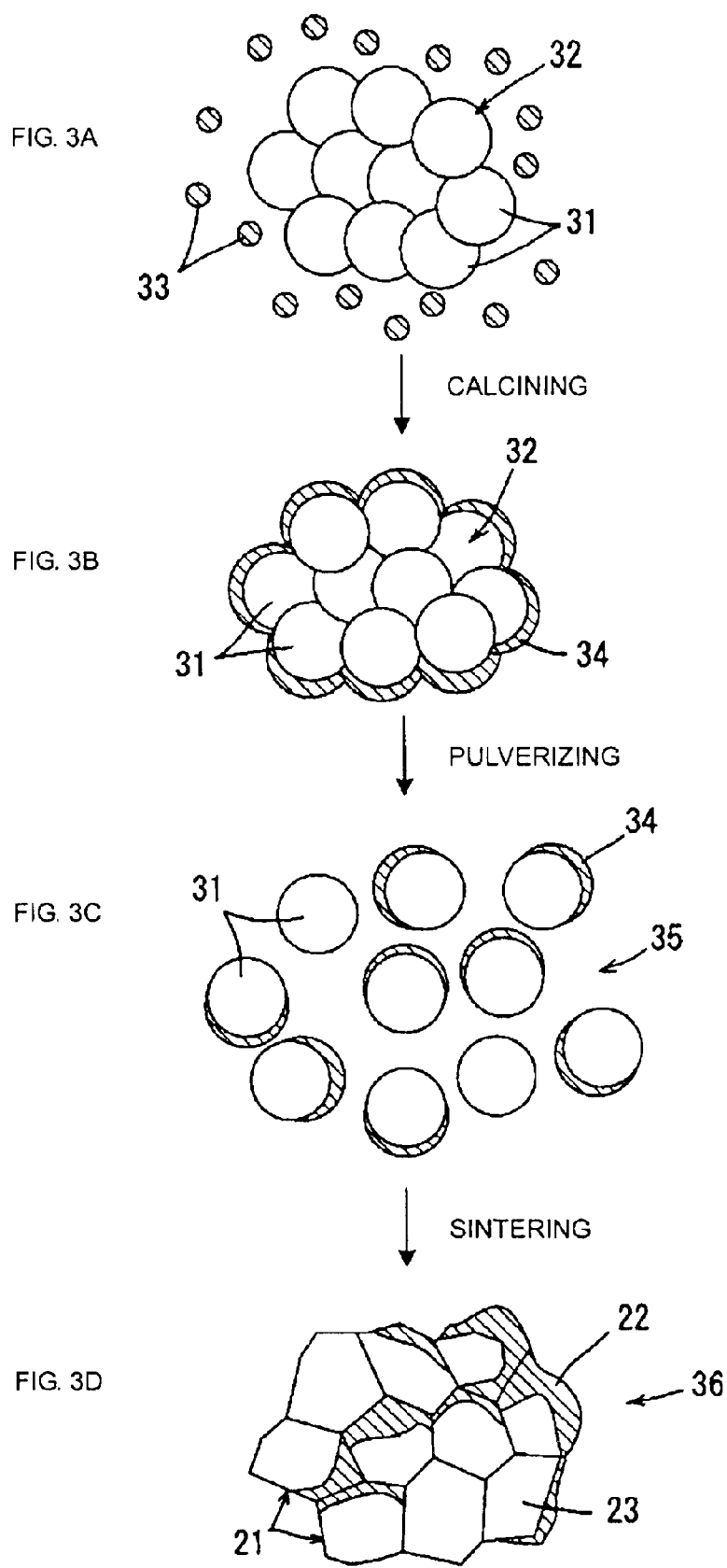

DIELECTRIC CERAMIC, METHOD FOR MAKING THE SAME, AND MONOLITHIC CERAMIC CAPACITOR

BACKGROUND OF THE INVENTION

1. Field of the Invention

The present invention relates to a dielectric ceramic and a fabrication method therefor, and a monolithic ceramic capacitor incorporating the dielectric ceramic. In particular, it relates to an improvement that effectively achieves thicknessreduction of dielectric ceramic layers of the monolithic ceramic capacitor.

2. Description of the Related Art

Monolithic ceramic capacitors are typically fabricated as follows.

First, a powder mainly containing a dielectric ceramic, for instance, $BaTiO_3$, is pulverized into primary particles as much as possible using a ball mill or the like and the pulverized powder is dispersed in a matrix to prepare a ceramic slurry. The ceramic slurry is shaped into ceramic green sheets. A conductive material, which will form internal electrodes, is applied on the surfaces of particular ceramic green sheets to form predetermined patterns on the surfaces.

A plurality of ceramic green sheets with the conductive material thereon are stacked and bonded through thermal compression to form a green composite.

The green composite is baked to form a sintered compact. The sintered compact has the internal electrodes composed of the above-described conductive material inside.

Subsequently, external electrodes that electrically connect with particular internal electrodes are formed on the outer surfaces of the compact. The external electrodes are formed, for example, by applying a conductive paste containing a glass frit and a conductive metal powder onto the outer surfaces of the compact and baking the applied paste. Thus, a monolithic ceramic capacitor is made.

Conventionally, palladium or a palladium-silver alloy has been used to make the internal electrodes. Recently, a relatively inexpensive base metal, such as nickel or copper, has been frequently employed to reduce the manufacturing cost of monolithic ceramic capacitors. In making monolithic ceramic capacitors having internal electrodes composed of a base metal, the baking step must be performed in a neutral or reducing atmosphere to prevent oxidation of the base metal. Thus, the dielectric ceramic used in the monolithic ceramic capacitor must be resistant to reduction.

In making a monolithic ceramic capacitor having a capacitance-temperature characteristics that comply with the B characteristics of Japanese Industrial Standards (JIS), a reduction-resistant dielectric ceramic containing $BaTiO_3$ as the main component, an oxide of a rare earth element, an acceptor element, such as Mn, Fe, Ni, or Cu, and a sintering aid has been employed.

For example, Japanese Unexamined Patent Application Publication Nos. 5-9066, 5-9067, 5-9068, and 9-270366 teach compositions of dielectric ceramics that exhibit a high dielectric constant with relatively small change with temperature and longer hightemperatureload life.

From the viewpoint of the structure and texture of the dielectric ceramic, Japanese Unexamined Patent Application Publication Nos. 6-5460, 2001-220224, and 2001-230149 teach dielectric ceramics having a so-called core-shell structure.

Japanese Unexamined Patent Application Publication No. 2001-313225 teaches a core-shell structure dielectric ceramic having the core partly exposed from the shell.

Recent advancements in electronics has accelerated the miniaturization of electronic components. Monolithic ceramic capacitors are becoming ever smaller while maintaining large capacitance. One effective measure for achieving both size-reduction and large capacitance is to reduce the thickness of dielectric ceramic layers of the capacitor. The thickness of the dielectric ceramic layers has been reduced to about 2 $\mu$m or less in manufactured capacitors and about 1 $\mu$m in experimental capacitors.

In order for the electric circuit to stably operate despite changes in temperature, the capacitance of the capacitor used in the circuit must also be a stable relative to temperature changes.

Thus, a monolithic ceramic capacitor having a capacitance that does not change largely relative to temperature changes and that exhibits superior electrical insulation and high reliability even when the thickness of the dielectric ceramic layers is reduced has been strongly desired.

The dielectric ceramics disclosed in the aforementioned Japanese Unexamined Patent Application Publication Nos. 5-9066, 5-9067, and 5-9068 satisfy the X7R characteristic of Electronic Industries Alliance (EIA) standards and exhibit superior electrical insulation. However, the capacitance-temperature characteristic and the reliability of these ceramics have not been sufficient to meet the demand of the market, especially when the thickness of the dielectric ceramic layers are reduced to about 5 $\mu$m or less or, in particular, about 3 $\mu$m or less. The dielectric ceramic disclosed in Japanese Unexamined Patent Application Publication No. 9-270366 also has a problem of degraded capacitance-temperature characteristic and reliability as the thickness of the dielectric ceramic layers is reduced.

The core-shell structure dielectric ceramic disclosed in Japanese Unexamined Patent Application Publication Nos. 6-5460, 2001-220224, and 2001-230149 have cores surrounded by shells. Since the thermal expansion coefficient of the core is different from that of the shell, an internal pressure, such as hydrostatic pressure, is applied on the core from the shell in the course of cooling after sintering. In general, the Curie point becomes lower when a hydrostatic pressure is applied on a ferromagnetic material such as $BaTiO_3$. Moreover, the Curie point of the dielectric ceramic mainly composed of $BaTiO_3$ is around 120° C. to minimize temperature dependency of the dielectric constant. Since the cores of the dielectric ceramics disclosed in Japanese Unexamined Patent Application Publication Nos. 6-5460, 2001-220224, and 2001-230149 are mainly composed of $BaTiO_3$, the monolithic ceramic capacitors that employ this type of dielectric ceramic suffer from degradation in capacitance-temperature characteristics particularly when the dielectric ceramic layers are thin. Moreover, the reliability is also poor.

The structure of the dielectric ceramic described in Japanese Unexamined Patent Application Publication No. 2001-313225 is made by controlling the sintering temperature. Electrical characteristics of such dielectric ceramic vary easily as a result, and the capacitance-temperature characteristics and the reliability cannot be stably achieved when the thickness of the dielectric ceramic layers is small.

Accordingly, the capacitance-temperature characteristics of the monolithic ceramic capacitors will be significantly degraded if the thickness of the dielectric ceramic layers is reduced to meet the demand for miniaturization and higher capacitance without changing the AC signal level. This is because the electric intensity applied to each dielectric ceramic layer will be increased. The reliability will also be degraded if the thickness of the dielectric ceramic layers is reduced without changing the DC rated voltage for the same reason.

Monolithic ceramic capacitors that can exhibit the same temperature dependency of the dielectric constant and superior reliability with thinner dielectric ceramic layers are desired.

SUMMARY OF THE INVENTION

An object of the present invention is to provide a method for making a dielectric ceramic and a monolithic ceramic capacitor composed of the dielectric ceramic that can overcome the aforementioned problems of the prior art.

To achieve this object, a first aspect of the present invention provides a dielectric ceramic including $ABO_3$ as the main component and a rare earth element, wherein A represents barium which may be partly replaced with at least one of calcium and strontium, and B represents titanium which may be partly replaced by at least one selected from zirconium and hafnium.

At least 70% of crystal grains of the dielectric ceramic have a cross-section in which a first region containing dissolved rare earth element occupies 5 to 70% of the area of the cross section and a second region free of the dissolved rare earth element occupies 10 to 80% of the periphery of the cross-section.

Preferably, the average concentration of the rare earth element inside the crystal grains is about half or less than half the average concentration of the rare earth element at the boundaries in the dielectric ceramic consisting of the crystal grains and grain boundaries.

The dielectric ceramic may further contain at least one acceptor element selected from manganese, nickel, iron, copper, magnesium, aluminum, chromium and vanadium.

The dielectric ceramic according may further contain a sintering aid containing at least one of silicon, boron and lithium.

A second aspect of the present invention provides a method for making the dielectric ceramic having the steps of preparing $ABO_3$ aggregates each composed of a plurality of primary particles, the $ABO_3$ aggregates being prepared by synthesizing $ABO_3$, wherein A represents barium which may be partly replaced with at least one of calcium and strontium, and B represents titanium which may be partly replaced with at least one selected from zirconium and hafnium; preparing a compound of a rare earth element; blending the $ABO_3$ aggregates with the compound and calcining the resulting mixture so that the rare earth element diffuses and dissolves in surface regions of the $ABO_3$ aggregates to prepare a calcined powder; and sintering the calcined powder.

Preferably, the step of preparing the $ABO_3$ aggregates further includes a substep of pulverizing the $ABO_3$ aggregates so that most of the aggregates are composed of about four to nineteen primary particles.

Preferably, the method further includes a step of pulverizing the calcined powder into primary particles prior to the sintering step.

A third aspect of the present invention provides a monolithic ceramic capacitor that includes a composite composed of a plurality of dielectric ceramic layers and internal electrodes disposed along the interfaces of particular dielectric ceramic layers; and external electrodes disposed on outer surfaces of the composite and electrically connected to particular internal electrodes. The dielectric ceramic layers are made of the above-described dielectric ceramic.

A monolithic ceramic capacitor having dielectric ceramic layers composed of the dielectric ceramic of the present invention can exhibit good capacitance-temperature characteristics and high reliability. The thickness of the dielectric ceramic layers can be reduced to achieved size-reduction and higher capacitance. In particular, the thickness of the dielectric ceramic layers can be reduced to approximately about 0.5 $\mu$m without causing problems.

With the dielectric ceramic having the average concentration of the rare earth element inside the crystal grains half or less than half the average concentration of the rare earth element at the boundaries, reliability can be further improved.

According to the method of the present invention, the $ABO_3$ aggregates are mixed with a rare earth element compound and calcined so as to allow the rare earth element to diffuse and dissolved in the surface regions of the $ABO_3$ aggregates to prepare the calcined powder, and the calcined powder is sintered. Thus, the dielectric ceramic that satisfied the aforementioned requirements can be securely made.

Moreover, by pulverizing the $ABO_3$ aggregates with dissolved rare earth element into primary particles prior to sintering, the thickness reduction of the dielectric ceramic can be further promoted.

BRIEF DESCRIPTION OF THE DRAWINGS

FIGS. 3A to 3D show the steps for making the dielectric ceramic of the present invention.

DESCRIPTION OF THE PREFERRED EMBODIMENTS

Figure 1:
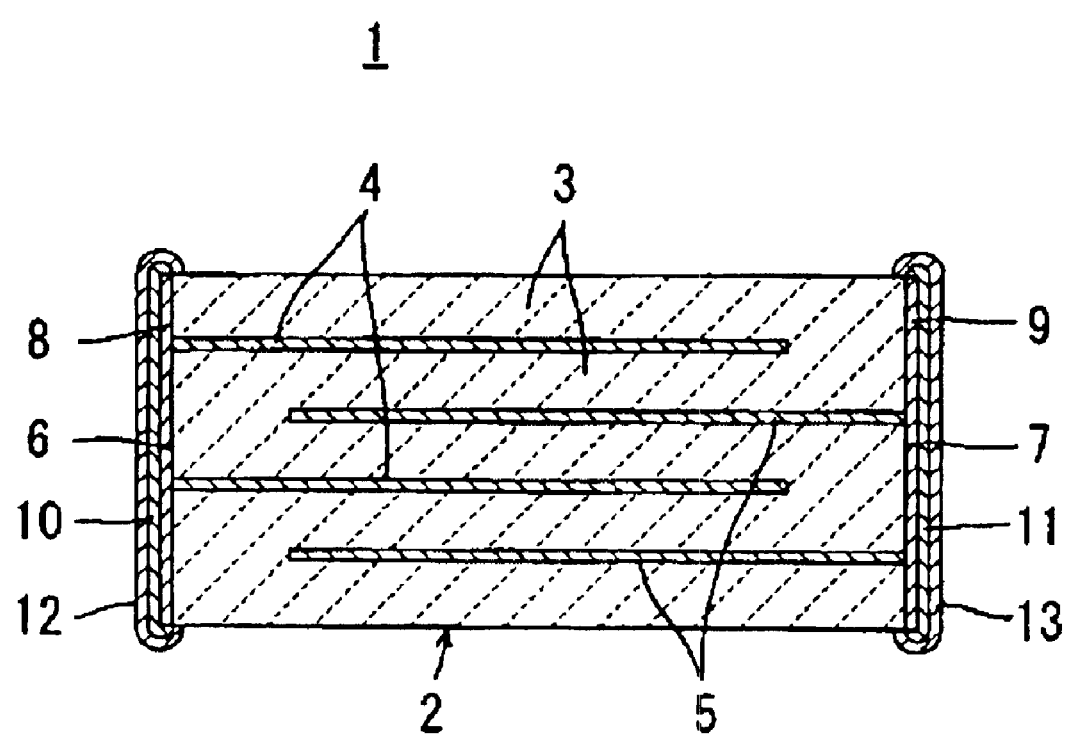
FIG. 1 is a cross-sectional view illustrating a monolithic ceramic capacitor 1 according to a first embodiment of the present invention.

FIG. 1 is a cross-sectional view illustrating a monolithic ceramic capacitor 1 according to a first embodiment of the present invention.

The monolithic ceramic capacitor 1 includes a composite 2. The composite 2 has a plurality of dielectric ceramic layers 3 and a plurality of internal electrodes 4 and 5 that extend along predetermined interfaces between the dielectric ceramic layers 3. An end of each internal electrode 5 is exposed at an end face 7 of the composite 2. An end of each internal electrode 4 is exposed at an end face 6 of the composite 2. The internal electrodes 4 and 5 are alternately arranged inside the composite 2, as shown in FIG. 1.

An external electrode 8 is formed on the end face 6 of the composite 2. An external electrode 9 is formed on the end face 7 of the composite 2. The external electrode 8 and the external electrode 9 are plated with a first plating layer 10 and a first plating layer 11, respectively. The first plating layers 10 and 11 are composed of, for example, nickel or copper. A second plating layer 12 and a second plating layer 13 are formed on the first plating layer 10 and the first plating layer 11, respectively.

The dielectric ceramic layers 3 are composed of a dielectric ceramic. The dielectric ceramic mainly contains $ABO_3$, wherein A represents barium which may be partly replaced with at least one of calcium and strontium, and B represents titanium which may be partly replaced by at least one selected from zirconium and hafnium. The dielectric ceramic layer 3 also contains a rare earth element such as scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) or lutetium (Lu).

Figure 2:
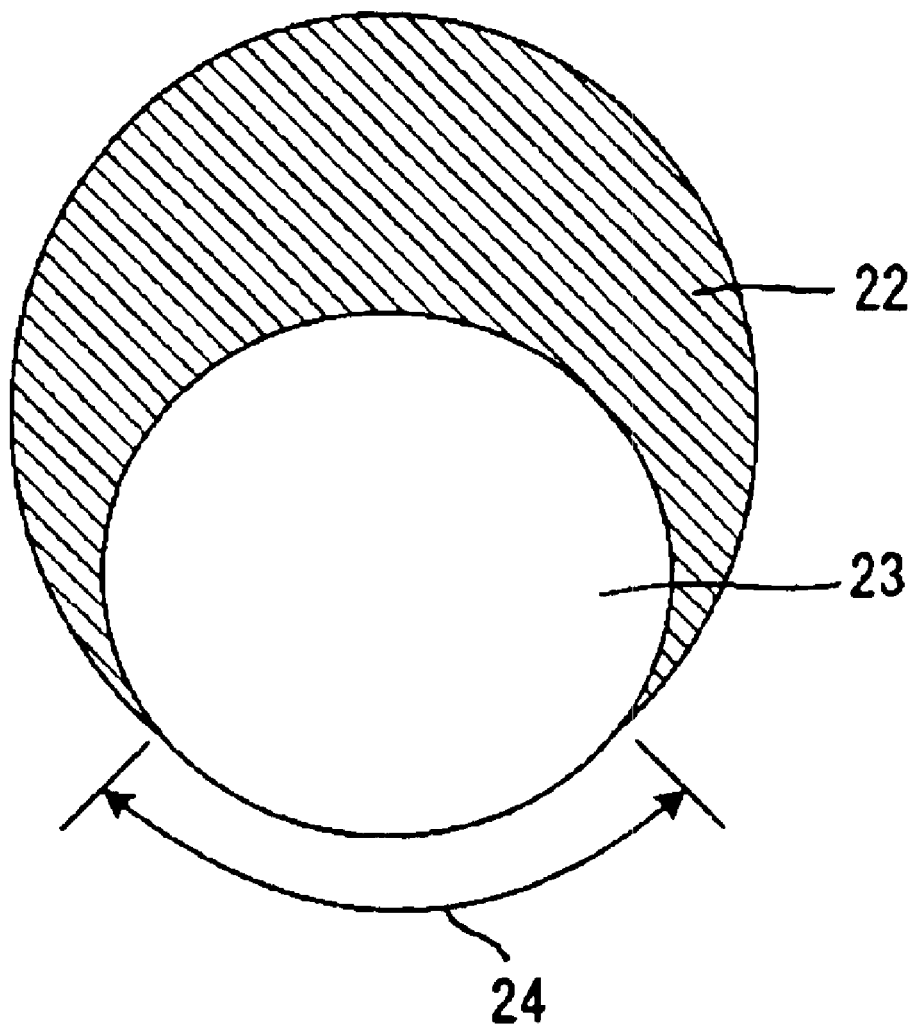
FIG. 2 is a cross-sectional view schematically showing a typical crystal grain 21 of the dielectric ceramic.

The structure of the dielectric ceramic will now be described with reference to FIG. 2. FIG. 2 is a cross-sectional view schematically showing a typical crystal grain 21 of the dielectric ceramic. At least 70% of the crystal grains that constitute the dielectric ceramic have the cross-section shown in FIG. 2.

The crystal grain 21 has a first region 22 that contains a dissolved rare earth element and a second region 23 that does not contain dissolved rare earth element.

The first region 22 occupies 5 to 70% of the area of the cross-section of the crystal grain 21. The second region 23 occupies 10 to 80% of the periphery of the cross-section. In FIG. 2, a range 24 of the periphery occupied by the second region 23 is indicated by the double-sided arrow. The periphery of the cross-section of the crystal grain 21 may have a plurality of the ranges 24.

When at least 70% of the crystal grains constituting the dielectric ceramic have the structure of the crystal grain 21 shown in FIG. 2, the temperature dependency of the dielectric constant does not degrade significantly and high reliability is achieved with thinner dielectric ceramic layers 3. The monolithic ceramic capacitor 1 that includes the dielectric ceramic layers 3 composed of this dielectric ceramic exhibits superior capacitance-temperature characteristics and high reliability.

In general, dielectric ceramics are constituted from crystal grains and grain boundaries between the crystal grains. The average density of the rare earth element inside the crystal grains is preferably not more than about half (zero at the minimum) the average density of the rare earth element at the grain boundaries. In this manner, the reliability of the monolithic ceramic capacitor 1 can be further improved even with thinner dielectric ceramic layers 3.

The dielectric ceramic may contain at least one acceptor element selected from manganese (Mn), nickel (Ni), iron (Fe), copper (Cu), magnesium (Mg), aluminum (Al), chromium (Cr) and vanadium (V) and may additionally contain a sintering aid selected containing at least one of silicon (Si), boron (B) and lithium (Li).

The internal electrodes 4 and 5 contain a base metal as the conductive component. Examples of the base metal include nickel, a nickel alloy, copper or copper alloy.

The external electrodes 8 and 9 are each either a sintered layer of a conductive metal powder or a sintered layer of a mixture of a glass frit and a conductive metal powder.

A method for making the monolithic ceramic capacitor 1 will now be described. FIGS. 3A to 3D show the steps for making the dielectric ceramic of the dielectric ceramic layers 3.

Referring now to FIG. 3A, an $ABO_3$ aggregate 32 composed of a plurality of $ABO_3$ primary particles 31 is prepared by synthesizing $ABO_3$. At this stage, pulverization conditions are adjusted so that the $ABO_3$ aggregate 32 maintains a proper aggregation state and does not break into primary particles 31. In order to efficiently obtain the $ABO_3$ aggregate 32, a spray dryer is preferably used. The $ABO_3$ aggregate 32 is preferably composed of about four to nineteen $ABO_3$ primary particles 31.

Next, a compound powder 33 of a rare earth element shown in FIG. 3A is prepared separately. The compound powder 33 is mixed with the $ABO_3$ aggregates 32 at a predetermined ratio, and the mixture is calcined in air. There is no restriction on the ratio and it can be selected to achieve any desired performance characteristic. Preferably, the rare earth is about 0.5 to 5 mol % of the combination. As shown in FIG. 3B, the rare earth element diffuses into the surfaces of the $ABO_3$ aggregates 32 and forms solid solution as a result of the calcination, thereby forming a first region 34 containing the dissolved rare earth element.

The $ABO_3$ aggregates 32 with the first regions 34 are pulverized into, for example, the $ABO_3$ primary particles 31 to prepare a dielectric ceramic powder 35, as shown in FIG. 3C. A particular percentage of the $ABO_3$ primary particles 31 have the first region 34. The $ABO_3$ aggregates 32 are preferably completely pulverized into the $ABO_3$ primary particles 31, as shown in FIG. 3C; however, some aggregates may remain incompletely pulverized.

The dielectric ceramic powder 35 may contain a compound containing at least one acceptor element selected from the group consisting of manganese (Mn), nickel (Ni), iron (Fe), copper (Cu), magnesium (Mg), aluminum (Al), chromium (Cr) and vanadium (V), and a sintering aid containing at least one selected from silicon (Si), boron (B) and lithium (Li), if necessary. The rare earth element may be added again at this stage. Whereas most of the rare earth element added before calcining is inside the crystal grains, the rare earth element added at this stage, i.e., after calcining but before sintering, mainly dwells in the grain boundaries.

Next, the dielectric ceramic powder 35 or a mixture containing the dielectric ceramic powder 35 is mixed with an organic binder and a solvent to prepare a slurry. Ceramic green sheets, which are the precursors of the dielectric ceramic layers 3, are then formed from the slurry.

Conductive paste films, which are the precursor of the internal electrodes 4 and 5, are then formed on particular ceramic green sheets by screen printing. The conductive paste films contain, for example, nickel, a nickel alloy, a copper or a copper alloy as the conductive component. The internal electrodes 4 and 5 may be formed by thin-film printing, such as screen printing, or any other thin-film forming method, such as vapor deposition, plating, or the like.

A plurality of ceramic green sheets including those with the conductive paste films are stacked, thermally press-bonded, and cut according to need so as to prepare a green composite. The green composite includes the ceramic green sheets and the conductive paste films, i.e., the precursors of the internal electrodes, formed along the interfaces of the specific ceramic green sheets. Each conductive paste film has one end exposed to an end face of the green composite.

The green composite is sintered in a reducing atmosphere such as nitrogen atmosphere to obtain a sintered compact 2 shown in FIG. 1. The sintered compact 2 includes the dielectric ceramic layers 3, i.e., the ceramic green sheets before sinter, and the internal electrodes 4 and 5, i.e., the conductive paste films before sinter.

The external electrode 8 and 9 are formed on the end faces 6 and 7, respectively. The external electrodes 8 and 9 are electrically connected with the exposed ends of the internal electrodes 4 and 5, respectively.

The external electrodes 8 and 9 are composed of the same material as the internal electrodes 4 and 5. Alternatively, the external electrodes 8 and 9 may be composed of silver, palladium, a silver-palladium alloy, or a mixture of a powder of any of these metals and a glass frit composed of a $B_2O_3$—$SiO_2$—BaO glass, a $Li_2O$—$SiO_2$—BaO glass, a $B_2O_3$—$Li_2O$—$SiO_2$—BaO glass, or the like. Material selection is made according to the usage of the monolithic ceramic capacitor 1, place of use, and the like.

The external electrodes 8 and 9 are normally made by applying a paste containing the above described conductive metal powder on the outer surfaces of the sintered compact 2 and baking the applied paste. Alternatively, the external electrodes 8 and 9 may be made by applying the paste on the outer surfaces of the green composite before sintering. In this manner, the compact 2 and the external electrodes 8 and 9 are made simultaneously.

The first plating layer 10 and 11 are formed on the external electrodes 8 and 9, respectively, by plating nickel, copper, and the like. The second plating layers 12 and 13 are then formed on the first plating layers 10 and 11, respectively, by plating solder, tin, or the like so as to form the monolithic ceramic capacitor 1. The plating layers 10 to 13 may be omitted depending on the usage of the monolithic ceramic capacitor 1.

FIG. 3D shows a sintered component 36 which constitutes the dielectric ceramic of the dielectric ceramic layers 3 of the monolithic ceramic capacitor 1. The sintered component 36 is composed of a plurality of crystal grains 21, at least 70% of which have the structure shown in the cross-sectional view of FIG. 2, i.e., a structure having the first region 22 occupying 5 to 70% of the cross-sectional area of the crystal grain 21 and the second region 23 occupying 10 to 80% of the periphery of the cross-section.

The main component of the dielectric ceramic, i.e., the $ABO_3$ primary particles 31 shown in FIG. 3C, preferably has an average particle diameter (average primary particle diameter) in the range of about 0.05 to 0.7 μm to allow thickness reduction of the dielectric ceramic layers 3. With such $ABO_3$ primary particles 31, the thickness of the dielectric ceramic layers 3 can be reduced to approximately about 0.5 μm without inflicting problems.

Contamination by foreign matter, such as aluminum (Al), zirconium (Zr), iron (Fe), hafnium (Hf), sodium (Na), nitrogen (N) or the like, may occur during the process of making the dielectric ceramic powder or during the steps for making the monolithic ceramic capacitor 1. However, the contamination does not affect the electrical characteristics of the monolithic ceramic capacitor 1. Moreover, foreign matter, such as iron (Fe), may contaminate the external electrodes 4 and 5 during the steps of making the monolithic ceramic capacitor 1. Such contamination does not affect the electrical characteristics of the monolithic ceramic capacitor 1, either.

EXAMPLES

The present invention will now be described by way of EXAMPLES conducted to confirm the advantages of the present invention.

Example 1

EXAMPLE 1 uses $BaTiO_3$ as the main component $ABO_3$, and $Y_2O_3$, NiO, $MnO_2$ and $SiO_2$ as the additive components.

First, $TiCl_4$ and $Ba(NO_3)_2$ were prepared as the starting materials of the $ABO_3$, and were deposited as barium titanyl oxalate $\{BaTiO(C_2O_4)\cdot 4H_2O\}$ using oxalic acid. The deposit was decomposed by heating with a spray dryer at 1,000° C. to synthesize $BaTiO_3$ aggregates.

After the $BaTiO_3$ aggregates were pulverized in a ball mill for five hours, the $BaTiO_3$ aggregates were observed with a scanning electron microscope (SEM). The observation confirmed that about 70% or more of the particles were aggregates composed of four to eight primary particles.

One hundred mols of the pulverized $BaTiO_3$ aggregates were blended with one mole of $Y_2O_3$, and the resulting mixture was calcined for two hours at 1,000° C. to form $BaTiO_3$ aggregates having yttrium (Y) dissolved in surface regions. The calcined $BaTiO_3$ aggregates were analyzed by X-ray diffractometry and compared with those before calcination. A slight change, indicating a reaction between $BaTiO_3$ and $Y_2O_3$, was observed in the diffraction peak.

The calcined $BaTiO_3$ aggregates were pulverized in a ball mill for 24 hours to prepare a $BaTiO_3$ powder containing dissolved yttrium in the surface regions of the particles.

One hundred mols of the $BaTiO_3$ powder with dissolved yttrium, 0.5 mol of a NiO powder, 0.5 mol of $MnO_2$ powder and 2 mols of $SiO_2$ powder were blended to prepare a powder mixture, i.e., a dielectric ceramic powder.

The powder mixture was blended with a polyvinyl butyral binder and an organic solvent, such as ethanol, and the resulting mixture was wet-mixed using a ball mill to prepare a ceramic slurry.

The ceramic slurry was formed into rectangular green ceramic sheets by a doctor blade method. The thickness of the green ceramic sheets was adjusted so that the thickness after sintering, i.e., the thickness of the resulting dielectric ceramic layer, became 1.5 μm.

A conductive paste containing nickel as the conductive component was applied on particular ceramic green sheets to prepare conductive paste layers, which are the precursors of the internal electrodes.

The ceramic green sheets including those with the conductive paste layers were stacked to form a green composite. The ceramic green sheets were stacked so that the ends of the conductive paste layers alternately appear in two end faces of the green composite.

The green composite was heated to 350° C. in nitrogen atmosphere to remove the binder and then sintered for two hours at 1,200° C. in reducing atmosphere containing $H_2$—$N_2$—$H_2O$ gas having an oxygen partial pressure of $10^{-10}$ MPa to prepare a sintered composite.

A conductive paste containing copper as the conductive component and a $B_2O_3$—$Li_2O$—$SiO_2$—BaO glass frit was applied on the two end faces of the sintered composite. The sintered composite and the applied paste were baked at 700° C. in reducing atmosphere to prepare external electrodes electrically connected to the internal electrodes.

The monolithic ceramic capacitor obtained had a width of 1.6 mm, a length of 3.2 mm and a thickness of 1.2 mm. The thickness of the dielectric ceramic layer between the internal electrodes was 1.5 μm. The number of the effective dielectric ceramic layers was 100, and the area in which the electrodes oppose each other was 2.1 $mm^2$ per layer.

Comparative Example 1-1

A monolithic ceramic capacitor was prepared as in EXAMPLE 1 except that the mixture of pulverized $BaTiO_3$ and $Y_2O_3$ was calcined at a temperature of 900° C.

The amount of the dissolved yttrium in the calcined $BaTiO_3$ aggregates was smaller than that in EXAMPLE 1.

Comparative Example 1-2

A monolithic ceramic capacitor was prepared as in EXAMPLE 1 except that the mixture of pulverized $BaTiO_3$ and $Y_2O_3$ was calcined at a temperature of 1,100° C.

The calcined $BaTiO_3$ aggregates were analyzed by X-ray diffractometry and were compared with those before calcination. A change indicating a decrease in the lattice constant was observed in the diffraction peak. The change is presumably due to yttrium forming solid solution over an extended range inside the $BaTiO_3$ aggregates. The amount of the dissolved yttrium in the $BaTiO_3$ aggregates was larger than that in EXAMPLE 1.

Comparative Example 1-3

A monolithic ceramic capacitor was prepared as in EXAMPLE 1 except that the synthesized $BaTiO_3$ was thoroughly pulverized for 48 hours in a ball mill to break the aggregates as finely as possible.

The thoroughly pulverized $BaTiO_3$ was observed with a scanning electron microscope (SEM). Approximately 90% or more of the dispersed particles were primary particles. Once calcined, yttrium dissolved in the wider area on the surfaces of the $BaTiO_3$ particles compared to that in EXAMPLE 1. In particular, a dielectric ceramic having a core-shell structure in which the core is completely covered with the shell of dissolved yttrium was obtained.

Comparative Example 1-4

A monolithic ceramic capacitor was prepared as in EXAMPLE 1 except that the barium titanyl oxalate {$BaTiO(C_2O_4) \cdot 4H_2O$} deposit was decomposed by heating at 1,150° C.

The resulting $BaTiO_3$ aggregates were observed with a SEM. Approximately 80% or more of the particles were aggregates composed of 20 or more primary particles. Since the $BaTiO_3$ aggregates of COMPARATIVE EXAMPLE 1-4 were larger than those in EXAMPLE 1, yttrium formed solid solution over a smaller region on the surfaces of the $BaTiO_3$ particles.

Example 2

EXAMPLE 2 used $(Ba_{0.95}Ca_{0.05})(Ti_{0.99}Zr_{0.01})O_3$ as the main component $ABO_3$, and $Y_2O_3$, $MgO$, $MnO_2$ and $SiO_2$ as the additive components.

First, $BaCO_3$, $CaCO_3$, $TiO_2$ and $ZrO_2$ were prepared as the starting materials for $ABO_3$. These ingredients were weighed to prepare a mixture of a predetermined composition. The mixture was calcined at 1,150° C. to synthesize $(Ba_{0.95}Ca_{0.05})(Ti_{0.99}Zr_{0.01})O_3$ aggregates.

The aggregates were observed with SEM. Approximately 70% or more of the particles were aggregates composed of four to eight primary particles.

The aggregates were blended with $Y_2O_3$, as in EXAMPLE 1, and the resulting mixture was calcined to obtain $(Ba_{0.95}Ca_{0.05})(Ti_{0.99}Zr_{0.01})O_3$ aggregates with yttrium solid solution on the surfaces. The aggregates were analyzed by X-ray diffractometry and compared with those before calcination. A slight change indicating the reaction between $(Ba_{0.95}Ca_{0.05})(Ti_{0.99}Zr_{0.01})O_3$ and $Y_2O_3$ was observed.

The calcined aggregates were pulverized as in EXAMPLE 1 to obtain a $(Ba_{0.95}Ca_{0.05})(Ti_{0.99}Zr_{0.01})O_3$ powder with yttrium dissolved in the surfaces.

Next, 100 mols of the $(Ba_{0.95}Ca_{0.05})(Ti_{0.99}Zr_{0.01})O_3$ powder with dissolved yttrium was blended with 1.0 mol of $MgO$ powder, 0.3 mol of $MnO_2$ powder, 2.5 mols of $SiO_2$ powder, and 0.2 mol of $Y_2O_3$ powder to prepare a powder mixture, i.e., a dielectric ceramic powder. EXAMPLE 2 differs from EXAMPLE 1 in the ceramic, in that the $Y_2O_3$ powder is added and in that $MgO$ is added instead of $NiO$.

Using the powder mixture, a monolithic ceramic capacitor was made as in EXAMPLE 1.

Comparative Example 2

A monolithic ceramic capacitor was prepared as in EXAMPLE 2 except that the synthesized $(Ba_{0.95}Ca_{0.05})(Ti_{0.99}Zr_{0.01})O_3$ was thoroughly pulverized for 48 hours in a ball mill to break the aggregates as finely as possible.

In COMPARATIVE EXAMPLE 2, the pulverized $(Ba_{0.95}Ca_{0.05})(Ti_{0.99}Zr_{0.01})O_3$ was observed by SEM. Not less than 90% of the pulverized $(Ba_{0.95}Ca_{0.05})(Ti_{0.99}Zr_{0.01})O_3$ were primary particles. After the calcination of the mixture containing pulverized $(Ba_{0.95}Ca_{0.05})(Ti_{0.99}Zr_{0.01})O_3$ and $Y_2O_3$, a dielectric ceramic having a core-shell structure identical to that of COMPARATIVE EXAMPLE 1-3, i.e., the dielectric ceramic composed of $(Ba_{0.95}Ca_{0.05})(Ti_{0.99}Zr_{0.01})O_3$ particles coated with yttrium solid solution, was obtained.

Evaluation

The monolithic ceramic capacitors prepared in EXAMPLES 1 and 2 and COMPARATIVE EXAMPLES 1-1 to 1-4 and 2 were evaluated as follows.

First, the ceramic structure of the dielectric ceramic layer of each monolithic ceramic capacitor was studied with transmission electron microscope (TEM)-energy dispersive x-ray (EDX) spectrometer.

In particular, a cross-section of a crystal grain of the dielectric ceramic was observed, and the presence of yttrium, i.e., the rare earth element, at randomly selected representative points in the cross-section was investigated. The cross-section of the crystal particle was sorted into regions with yttrium and regions free of yttrium to determine the ratio of the regions with dissolved yttrium to the entire area of the crystal grain cross-section. Hereinafter, this ratio is referred to as the "cross-sectional ratio".

The presence of yttrium at randomly selected representative points in the periphery of the cross-section of the crystal grain was also investigated. The periphery of the cross-section was sorted into segments with yttrium and segments free of yttrium to determine the ratio of the length of the segments free of dissolved yttrium relative to the entire length of the periphery. Hereinafter, this ratio is referred to as the "peripheral ratio".

The percentage of the crystal particles that had a cross-sectional ratio in the range of about 5 to 70% and a peripheral ratio in the range of about 10 to 80% was also determined. These ranges are hereinafter referred to as the "cross-sectional and peripheral conditions".

The concentrations of yttrium at randomly selected representative points in a cross-section of crystal grains and at randomly selected representative points in a cross-section of crystal boundaries were investigated. The average yttrium concentrations inside the crystal grain and in the grain boundaries were respectively determined. Based on the results, the ratio of the average yttrium concentration inside the crystal grain to the average yttrium concentration at grain boundaries was determined. This ratio is hereinafter referred to as the "inner-particle/boundary concentration ratio".

Table 1 shows the percentage of the crystal grains that satisfy the cross-sectional and peripheral conditions described above and the inner-particle/boundary concentration ratio.

TABLE 1

| | Percentage of the crystal grains that satisfy the cross-sectional and peripheral conditions | Inner-particle/boundary concentration ratio |
|---|---|---|
| EXAMPLE 1 | 76% | 45% |
| COMPARATIVE EXAMPLE 1-1 | 61% | 39% |
| COMPARATIVE EXAMPLE 1-2 | 28% | 48% |
| COMPARATIVE EXAMPLE 1-3 | 7% | 37% |
| COMPARATIVE EXAMPLE 1-4 | 30% | 41% |
| EXAMPLE 2 | 92% | 15% |
| COMPARATIVE EXAMPLE 2 | 3% | 18% |

Table 2 shows distribution of the cross-sectional ratio and the peripheral ratio percentages of the crystal grains that satisfied and did not satisfy the cross-sectional and peripheral conditions described above.

TABLE 2

|  | Crystal grains that satisfied the cross-sectional and peripheral conditions | | Crystal grains that did not satisfy the cross-sectional and peripheral conditions | |
|---|---|---|---|---|
|  | Cross-sectional ratio | Peripheral ratio | Cross-sectional ratio | Peripheral ratio |
| EXAMPLE 1 | 22 to 57% | 31 to 80% | 24 to 59% | 81 to 89% |
| COMPARATIVE EXAMPLE 1-1 | 5 to 21% | 51 to 72% | 1 to 4% | 61 to 73% |
| COMPARATIVE EXAMPLE 1-2 | 45 to 70% | 16 to 32% | 71 to 83% | 18 to 45% |
| COMPARATIVE EXAMPLE 1-3 | 16 to 39% | 10 to 31% | 19 to 42% | 0% |
| COMPARATIVE EXAMPLE 1-4 | 39 to 68% | 62 to 80% | 38 to 62% | 81 to 92% |
| EXAMPLE 2 | 44 to 63% | 10 to 39% | 42 to 67% | 0 to 9% |
| COMPARATIVE EXAMPLE 2 | 13 to 42% | 10 to 19% | 13 to 39% | 0% |

The dielectric constant of the dielectric ceramic layer of each monolithic ceramic capacitor sample was determined at room temperature, i.e., 25° C., at 1 kHz and 1 $V_{rms}$.

The rate of change in capacitance relative to temperature change was also determined. In particular, the rate of change at −25° C. and at 85° C. relative to the capacitance at 20° C., i.e., the B characteristic according to JIS, was determined, and the rate of change at −55° C. and at 125° C. relative to the capacitance at 25° C., i.e., the X7R characteristic according to EIA standards, was determined.

A high-temperature load test was conducted on 100 samples. The changes in insulation resistance over time were examined by applying a voltage of 12 V so that the field intensity was 8 kV/mm and by applying a voltage of 21 V so that the field intensity was 14 kV/mm. The samples that exhibited an insulation resistance of 200 kΩ or less before 1,000 hours were assumed as defective. The number of the defective samples was determined. The results are shown in Table 3.

boundary concentration ratio was less than 1/2 in both EXAMPLES 1 and 2, i.e., 45% in EXAMPLE 1 and 15% in EXAMPLE 2.

Table 2 shows that in EXAMPLE 1, the cross-sectional ratio of the crystal grains that satisfy the cross-sectional and peripheral conditions distributed over the range of 22 to 57%, and the peripheral ratio over the range of 31 to 80%. In EXAMPLE 2, the cross-sectional ratio distributed over the range of 44 to 63%, and the peripheral ratio over the range of 10 to 39%.

The results show that the samples of EXAMPLES 1 and 2 satisfy the B characteristic of JIS and the X7R characteristic of EIA standards and that the reliability is high in the high-temperature load test.

Table 1 also shows that the inner-particle/boundary concentration ratio of EXAMPLE 2 is significantly lower than that of EXAMPLE 1. The sample of EXAMPLE 2 exhibits superior reliability in the high-temperature load test particularly when an electric field of 14 kV/mm is applied, as shown in Table 3.

In contrast, the percentage of the crystal grains that satisfy the cross-sectional and peripheral conditions was less than 70% in all COMPARATIVE EXAMPLES 1-1, 1-2, 1-3, 1-4, and 2, which resulted in poor reliability in the capacitance-temperature characteristics and the high-temperature load test, as shown in Table 3.

In particular, in COMPARATIVE EXAMPLE 1-1, the amount of the dissolved yttrium in the $BaTiO_3$ aggregates was small. Accordingly, the cross-sectional ratio was low, as shown in Table 2, and the reliability was poor, as shown in Table 3.

In COMPARATIVE EXAMPLE 1-2, the amount of the yttrium solid solution on the $BaTiO_3$ aggregates was excessively large. Accordingly, the cross-sectional ratio was high, as shown in Table 2, and the capacitance-temperature characteristics were poor, as shown in Table 3.

In COMPARATIVE EXAMPLE 1-3, the peripheral ratio was low, as shown in Table 2, since most of the $BaTiO_3$ aggregates were pulverized into primary particles and then mixed with the $Y_2O_3$, as is described above. Thus, the capacitance-temperature characteristics were poor, as shown in Table 3.

In COMPARATIVE EXAMPLE 1-4, the peripheral ratio was high, as shown in Table 2, since most of the $BaTiO_3$

TABLE 3

|  | Dielectric constant | Capacitance-temperature characteristics | | | | No. of defective samples in high-temperature load test | |
|---|---|---|---|---|---|---|---|
|  |  | 20° C. | | 25° C. | | | |
|  |  | −25° C. | 85° C. | −55° C. | 125° C. | 8 kV/mm | 14 kV/mm |
| EXAMPLE 1 | 2830 | 2.2 | −6.5 | 2.0 | −11.7 | 0/100 | 1/100 |
| COMPARATIVE EXAMPLE 1-1 | 2920 | 2.5 | −6.8 | 2.2 | −11.8 | 5/100 | 24/100 |
| COMPARATIVE EXAMPLE 1-2 | 2870 | 3.2 | −10.2 | 3.5 | −16.9 | 0/100 | 3/100 |
| COMPARATIVE EXAMPLE 1-3 | 2880 | 3.5 | −10.1 | 3.3 | −17.1 | 0/100 | 2/100 |
| COMPARATIVE EXAMPLE 1-4 | 3110 | 3.1 | −7.1 | 3.4 | −11.6 | 9/100 | 51/100 |
| EXAMPLE 2 | 2720 | 0.5 | −7.1 | 1.2 | −13.8 | 0/100 | 0/100 |
| COMPARATIVE EXAMPLE 2 | 2790 | 3.5 | −10.3 | 4.0 | −17.2 | 0/100 | 0/100 |

As shown in Table 1, the percentage of the crystal grains that satisfied the cross-sectional and peripheral conditions exceeded 70% in both EXAMPLES 1 and 2, i.e., 76% in EXAMPLE 1 and 92% in EXAMPLE 2. The inner-particle/ aggregates were composed of twenty or more primary particles. Thus, the reliability was poor, as shown in Table 3.

In COMPARATIVE EXAMPLE 2, the peripheral ratio was low for the reasons same as those of COMPARATIVE EXAMPLE 1-3. Thus, the capacitance-temperature characteristics were poor, as shown in Table 3.

Example 3-1

A $(Ba_{0.80}Ca_{0.20})(Ti_{0.996}Hf_{0.004})O_3$ powder with samarium and thulium dissolved in the grain surfaces was prepared as in EXAMPLE 2 except that $(Ba_{0.80}Ca_{0.20})(Ti_{0.996}Hf_{0.004})O_3$ aggregates were synthesized and that 100 mols of the $(Ba_{0.80}Ca_{0.20})(Ti_{0.996}Hf_{0.004})O_3$ aggregates were blended with 0.5 mol of samarium and 0.5 mol of thulium.

One hundred mols of the $(Ba_{0.80}Ca_{0.20})(Ti_{0.996}Hf_{0.004})O_3$ powder, 0.2 mol of gadolinium (Gd), 0.2 mol of ytterbium (Yb), 0.3 mol of manganese (Mn), 1.5 mols of chromium (Cr), and 1.6 mols of a sintering aid composed of Si—Li—O (Si:Li=0.9:0.1) were mixed to prepare a powder mixture, i.e., a dielectric ceramic powder.

Using the powder mixture, a monolithic ceramic capacitor was made as in EXAMPLE 1. The monolithic ceramic capacitor was evaluated under the same conditions as above. The results are shown in Table 4.

Cross-sections of crystal grains of the dielectric ceramic layer of this monolithic ceramic capacitor were studied. At least 70% of the crystal grains had regions with dissolved rare earth element occupying 5 to 70% of the area of the cross-section and the regions free of dissolved rare earth element occupying 10 to 80% of the periphery of the cross-section. Moreover, the average rare earth element concentration inside the crystal grains was half or less than half that at the grain boundaries.

Example 3-2

A $(Ba_{0.81}Ca_{0.19})TiO_3$ powder with terbium (Tb) dissolved in the grain surfaces was prepared as in EXAMPLE 2 except that $(Ba_{0.81}Ca_{0.19})TiO_3$ aggregates were prepared and the material powder was prepared by mixing 100 mols of $(Ba_{0.81}Ca_{0.19})TiO_3$ aggregates and 0.2 mol of terbium (Tb).

One hundred mols of the $(Ba_{0.81}Ca_{0.19})TiO_3$ powder was mixed with 0.2 mol of europium (Eu), 1.0 mol of nickel (Ni), 1.0 mol of magnesium (Mg), and 0.5 mol of a sintering aid composed of Si—O to prepare a powder mixture, i.e., a dielectric ceramic powder.

Using the powder mixture, a monolithic ceramic capacitor was prepared as in EXAMPLE 1. The monolithic ceramic capacitor was evaluated under the same conditions as those described above. The results are shown in Table 4.

Cross-sections of crystal grains of the dielectric ceramic layer of this monolithic ceramic capacitor were studied. At least 70% of the crystal grains had regions with rare earth element solid solution occupying 5 to 70% of the cross section and the regions free of rare earth element solid solution occupying 10 to 80% of the periphery of the cross-section. Moreover, the average rare earth element concentration inside the crystal grains was half or less than half that at the grain boundaries.

Example 3-3

A $(Ba_{0.96}Ca_{0.04})(Ti_{0.99}Zr_{0.01})O_3$ powder with terbium (Tb) and yttrium (Y) dissolved in the grain surfaces was prepared as in EXAMPLE 2 except that $(Ba_{0.96}Ca_{0.04})(Ti_{0.99}Zr_{0.01})O_3$ aggregates were prepared and the material powder was prepared by mixing 100 mols of the $(Ba_{0.96}Ca_{0.04})(Ti_{0.99}Zr_{0.01})O_3$ aggregates, 0.3 mol of terbium (Tb), and 1.0 mol of yttrium (Y).

Next, 100 mols of the $(Ba_{0.96}Ca_{0.04})(Ti_{0.99}Zr_{0.01})O_3$ powder was blended with 0.2 mol of holmium (Ho), 0.1 mol or erbium (Er), 1.0 mol of magnesium (Mg), 0.2 mol of manganese (Mn), 0.2 of iron (Fe), and 1.1 mols of a sintering aid composed of Si—B—O (Si:B=0.75:0.25) to prepare a powder mixture, i.e., a dielectric ceramic powder.

Using the powder mixture, a monolithic ceramic capacitor was prepared as in EXAMPLE 1. The monolithic ceramic capacitor was evaluated under the same conditions as those described above. The results are shown in Table 4.

Cross-sections of crystal grains of the dielectric ceramic layer of this monolithic ceramic capacitor were studied. At least 70% of the crystal grains had regions with rare earth element solid solution occupying 5 to 70% of the cross section and the regions free of rare earth element solid solution occupying 10 to 80% of the periphery of the cross-section. Moreover, the average rare earth element concentration inside the crystal grains was half or less than half that at the grain boundaries.

Comparative Example 3-4

A $(Ba_{0.95}Ca_{0.05})(Ti_{0.995}Hf_{0.005})O_3$ powder with praseodymium (Pr) and ytterbium (Yb) dissolved in the particle surfaces was prepared as in EXAMPLE 2 except that $(Ba_{0.95}Ca_{0.05})(Ti_{0.995}Hf_{0.005})O_3$ aggregates were synthesized and 100 mols of the $(Ba_{0.95}Ca_{0.05})(Ti_{0.995}Hf_{0.005})O_3$ aggregates were blended with 1.0 mol of praseodymium and 1.0 mol of ytterbium to prepare the material powder.

Next, 100 mol of the $(Ba_{0.95}Ca_{0.05})(Ti_{0.995}Hf_{0.005})O_3$ powder was blended with 0.5 mol of yttrium, 0.1 mol of vanadium, 0.5 mol of aluminum, 0.2 mol of manganese, and 1.4 mol of a sintering aid composed of Si—B—O (Si:B=0.85:0.15) to prepare a powder mixture, i.e., the dielectric ceramic powder.

Using the powder mixture, a monolithic ceramic capacitor was made as in EXAMPLE 1. The monolithic ceramic capacitor was evaluated under the same conditions as those described above. The results are shown in Table 4.

Cross-sections of crystal grains of the dielectric ceramic layer of this monolithic ceramic capacitor were studied. At least 70% of the crystal grains had regions with rare earth element solid solution occupying 5 to 70% of the cross section and the regions free of rare earth element solid solution occupying 10 to 80% of the periphery of the cross-section. Moreover, the average rare earth element concentration inside the crystal grains was half or less than half that at the grain boundaries.

Example 3-5

A $(Ba_{0.90}Ca_{0.09}Sr_{0.01})TiO_3$ powder with erbium (Er) dissolved in the particle surfaces was prepared as in EXAMPLE 2 except that $(Ba_{0.90}Ca_{0.09}Sr_{0.01})TiO_3$ aggregates were synthesized and 100 mols of the $(Ba_{0.90}Ca_{0.09}Sr_{0.01})TiO_3$ aggregates were blended with 1.0 mol of erbium (Er) to prepare the material powder.

Next, 100 mols of the $(Ba_{0.90}Ca_{0.09}Sr_{0.01})TiO_3$ powder was blended with 0.1 mol of neodymium (Nd), 0.1 mol of dysprosium (Dy), 1.0 mol of nickel (Ni), 1.0 mol of aluminum (Al), and 1.0 mol of a sintering aid composed of Si—O to prepare a powder mixture, i.e., the dielectric ceramic powder.

Using the powder mixture, a monolithic ceramic capacitor was made as in EXAMPLE 1. The monolithic ceramic capacitor was evaluated under the same conditions as those described above. The results are shown in Table 4.

Cross-sections of crystal grains of the dielectric ceramic layer of this monolithic ceramic capacitor were studied. At least 70% of the crystal grains had regions with rare earth element solid solution occupying 5 to 70% of the cross section and the regions free of rare earth element solid solution occupying 10 to 80% of the periphery of the cross-section. Moreover, the average rare earth element concentration inside the crystal grains was half or less than half that at the grain boundaries.

Example 3-6

A BaTiO$_3$ powder with dysprosium (Dy) and cerium (Ce) dissolved in the particle surfaces was prepared as in EXAMPLE 2 except that 100 mols of BaTiO$_3$ aggregates were blended with 2.5 mols of dysprosium (Dy) and 0.3 mol of cerium (Ce).

Next, 100 mols of the BaTiO$_3$ powder was blended with 0.2 mol of erbium (Er), 0.1 mol of gadolinium (Gd), 0.5 mol of copper (Cu), 0.8 mol of chromium (Cr), and 1.9 mols of a sintering aid composed of Si—Li—O (Si:Li=0.95:0.05), to prepare a powder mixture, i.e., the dielectric ceramic powder.

Using the powder mixture, a monolithic ceramic capacitor was made as in EXAMPLE 1. The monolithic ceramic capacitor was evaluated under the same conditions as those described above. The results are shown in Table 4.

Cross-sections of crystal grains of the dielectric ceramic layer of this monolithic ceramic capacitor were studied. At least 70% of the crystal grains had regions with rare earth element solid solution occupying 5 to 70% of the cross section and the regions free of rare earth element solid solution occupying 10 to 80% of the periphery of the cross-section. Moreover, the average rare earth element concentration inside the crystal grains was half or less than half that at the grain boundaries.

Example 3-7

A (Ba$_{0.98}$Ca$_{0.02}$)TiO$_3$ powder with thulium (Tm) dissolved in the particle surfaces was prepared as in EXAMPLE 2 except that (Ba$_{0.98}$Ca$_{0.02}$)TiO$_3$ aggregates were synthesized, and 100 mols of the (Ba$_{0.98}$Ca$_{0.02}$)TiO$_3$ aggregates were blended with 1.5 mols of thulium (Tm) to make the material powder.

Next, 100 mols of the (Ba$_{0.98}$Ca$_{0.02}$)TiO$_3$ powder was blended with 0.1 mol of samarium (Sm), 0.2 mol of holmium (Ho), 0.2 mol of manganese (Mn), 3.0 mols of magnesium (Mg), and 2.3 mols of a sintering aid composed of Si—B—O (Si:B=0.65:0.35) to prepare a powder mixture, i.e., the dielectric ceramic powder.

Using the powder mixture, a monolithic ceramic capacitor was made as in EXAMPLE 1. The monolithic ceramic capacitor was evaluated under the same conditions as those described above. The results are shown in Table 4.

Cross sections of crystal grains of the dielectric ceramic layer of this monolithic ceramic capacitor were studied. At least 70% of the crystal grains had regions with rare earth element solid solution occupying 5 to 70% of the cross section and the regions free of rare earth element solid solution occupying 10 to 80% of the periphery of the cross-section. Moreover, the average rare earth element concentration inside the crystal grains was half or less than half that at the grain boundaries.

Example 3-8

A (Ba$_{0.95}$Ca$_{0.05}$)(Ti$_{0.985}$Zr$_{0.005}$Hf$_{0.01}$)O$_3$ powder with cerium (Ce) dissolved in the particle surfaces was prepared as in EXAMPLE 2 except that (Ba$_{0.95}$Ca$_{0.05}$)(Ti$_{0.985}$Zr$_{0.005}$Hf$_{0.01}$)O$_3$ aggregates were synthesized, and 100 mols of the (Ba$_{0.95}$Ca$_{0.05}$)(Ti$_{0.985}$Zr$_{0.005}$Hf$_{0.01}$)O$_3$ aggregates were blended with 1.8 mols of cerium (Ce) to prepare the material powder.

Next, 100 mols of the (Ba$_{0.95}$Ca$_{0.05}$)(Ti$_{0.985}$Zr$_{0.005}$Hf$_{0.01}$)O$_3$ powder was blended with 0.3 mol of dysprosium (Dy), 0.1 mol of iron (Fe), 0.1 mol of vanadium (V), 1.0 mol of copper (Cu), and 1.2 mols of a sintering aid composed of Si—O to prepare a powder mixture, i.e., the dielectric ceramic powder.

Using the powder mixture, a monolithic ceramic capacitor was made as in EXAMPLE 1. The monolithic ceramic capacitor was evaluated under the same conditions as those described above. The results are shown in Table 4.

Cross sections of crystal grains of the dielectric ceramic layer of this monolithic ceramic capacitor were studied. At least 70% of the crystal grains had regions with rare earth element solid solution occupying 5 to 70% of the cross section and the regions free of rare earth element solid solution occupying 10 to 80% of the periphery of the cross-section. Moreover, the average rare earth element concentration inside the crystal grains was half or less than half that at the grain boundaries.

Example 3-9

A (Ba$_{0.90}$Ca$_{0.09}$Sr$_{0.01}$)TiO$_3$ powder with holmium (Ho) dissolved in the particle surfaces was prepared as in EXAMPLE 2 except that (Ba$_{0.90}$Ca$_{0.09}$Sr$_{0.01}$)TiO$_3$ aggregates were synthesized, and 100 mols of the (Ba$_{0.90}$Ca$_{0.09}$Sr$_{0.01}$)TiO$_3$ aggregates were blended with 2.5 mols of holmium (Ho) to prepare the material powder.

Next, 100 mols of the (Ba$_{0.90}$Ca$_{0.09}$Sr$_{0.01}$)TiO$_3$ powder was blended with 0.1 mol of thulium (Tm), 0.2 mol of terbium (Tb), 0.2 mol of iron (Fe), 0.3 mol of chromium (Cr), 0.3 mol of manganese (Mn), and 1.8 mols of a sintering aid composed of Si—Li—B—O (Si:Li:B=0.8:0.1:0.1) to prepare a powder mixture, i.e., the dielectric ceramic powder.

Using the powder mixture, a monolithic ceramic capacitor was made as in EXAMPLE 1. The monolithic ceramic capacitor was evaluated under the same conditions as those described above. The results are shown in Table 4.

Cross sections of crystal grains of the dielectric ceramic layer of this monolithic ceramic capacitor were studied. At least 70% of the crystal grains had regions with rare earth element solid solution occupying 5 to 70% of the cross section and the regions free of rare earth element solid solution occupying 10 to 80% of the periphery of the cross-section. Moreover, the average rare earth element concentration inside the crystal grains was half or less than half that at the grain boundaries.

Example 3-10

A (Ba$_{0.95}$Ca$_{0.05}$)TiO$_3$ powder with gadolinium (Gd) and lutetium (Lu) dissolved in the particle surfaces was prepared as in EXAMPLE 2 except that (Ba$_{0.95}$Ca$_{0.05}$)TiO$_3$ aggregates were synthesized, and 100 mols of the (Ba$_{0.95}$Ca$_{0.05}$)TiO$_3$ aggregates were blended with 0.5 mol of gadolinium (Gd) and 0.8 mol of lutetium (Lu) to prepare the material powder.

Next, 100 mols of the (Ba$_{0.95}$Ca$_{0.05}$)TiO$_3$ powder was blended with 0.1 mol of dysprosium, 0.1 mol of samarium, 0.5 mol of chromium, 1.5 mols of magnesium, and 2.4 mols of a sintering aid composed of Si—Li—O (Si:Li=0.97:0.03) to prepare a powder mixture, i.e., the dielectric ceramic powder.

Using the powder mixture, a monolithic ceramic capacitor was made as in EXAMPLE 1. The monolithic ceramic capacitor was evaluated under the same conditions as those described above. The results are shown in Table 4.

Cross sections of crystal grains of the dielectric ceramic layer of this monolithic ceramic capacitor were studied. At least 70% of the crystal grains had regions with rare earth element solid solution occupying 5 to 70% of the cross section and the regions free of rare earth element solid solution occupying 10 to 80% of the periphery of the cross-section. Moreover, the average rare earth element concentration inside the crystal grains was half or less than half that at the grain boundaries.

Example 3-11

A (Ba$_{0.90}$Ca$_{0.10}$)TiO$_3$ powder with cerium and erbium dissolved in the particle surfaces was prepared as in EXAMPLE 2 except that $(Ba_{0.90}Ca_{0.10})TiO_3$ aggregates were synthesized, and 100 mols of the aggregates were blended with 0.1 mol of cerium (Ce) and 1.6 mols of erbium (Er) to prepare the material powder.

Next, 100 mols of the $(Ba_{0.90}Ca_{0.10})TiO_3$ powder was blended with 0.3 mol of gadolinium, 0.1 mol of manganese, 0.3 mol of aluminum, and 0.5 mol of a sintering aid composed of Si—B—O (Si:B=0.7:0.3) to prepare a powder mixture, i.e., the dielectric ceramic powder.

Using the powder mixture, a monolithic ceramic capacitor was made as in EXAMPLE 1. The monolithic ceramic capacitor was evaluated under the same conditions as those described above. The results are shown in Table 4.

Cross sections of crystal grains of the dielectric ceramic layer of this monolithic ceramic capacitor were studied. At least 70% of the crystal grains had regions with rare earth element solid solution occupying 5 to 70% of the cross section and the regions free of rare earth element solid solution occupying 10 to 80% of the periphery of the cross-section. Moreover, the average rare earth element concentration inside the crystal grains was half or less than half that at the grain boundaries.

Example 3-12

A $(Ba_{0.91}Ca_{0.08}Sr_{0.01})(Ti_{0.99}Zr_{0.01})O_3$ powder with holmium and thulium dissolved in the particle surfaces was prepared as in EXAMPLE 2 except that $(Ba_{0.91}Ca_{0.08}Sr_{0.01})(Ti_{0.99}Zr_{0.01})O_3$ aggregates was synthesized and 100 mols of the aggregates were blended with 1.0 mol of holmium and 1.0 mol of thulium to prepare the material powder.

Next, 100 mols of the $(Ba_{0.91}Ca_{0.08}Sr_{0.01})(Ti_{0.99}Zr_{0.01})O_3$ powder was blended with 0.4 mol of praseodymium, 2.0 mol of nickel, 0.2 mol of vanadium, and 2.2 mols of a sintering aid composed of Si—Li—O (Si:Li=0.88:0.12) to prepare a powder mixture, i.e., the dielectric ceramic powder.

Using the powder mixture, a monolithic ceramic capacitor was made as in EXAMPLE 1. The monolithic ceramic capacitor was evaluated under the same conditions as those described above. The results are shown in Table 4.

Cross sections of crystal grains of the dielectric ceramic layer of this monolithic ceramic capacitor were studied. At least 70% of the crystal grains had regions with rare earth element solid solution occupying 5 to 70% of the cross section and the regions free of rare earth element solid solution occupying 10 to 80% of the periphery of the cross-section. Moreover, the average rare earth element concentration inside the crystal grains was half or less than half that at the grain boundaries.

Examples 3-13

A $(Ba_{0.92}Ca_{0.08})(Ti_{0.995}Zr_{0.005})O_3$ powder with lutetium dissolved in the particle surfaces was prepared as in EXAMPLE 2 except that $(Ba_{0.92}Ca_{0.08})(Ti_{0.995}Zr_{0.005})O_3$ aggregates was synthesized and 100 mols of the aggregates were blended with 0.9 mol of lutetium to prepare the material powder.

Next, 100 mols of the $(Ba_{0.92}Ca_{0.08})(Ti_{0.995}Zr_{0.005})O_3$ powder was blended with 0.1 mol of gadolinium, 0.2 mol of thulium, 0.1 mol of manganese, 0.4 mol of copper, and 0.2 mol of a sintering aid composed of Si—Li—B—O (Si:Li:B= 0.6:0.1:0.3) to prepare a powder mixture, i.e., the dielectric ceramic powder.

Using the powder mixture, a monolithic ceramic capacitor was made as in EXAMPLE 1. The monolithic ceramic capacitor was evaluated under the same conditions as those described above. The results are shown in Table 4.

Cross-sections of crystal grains of the dielectric ceramic layer of this monolithic ceramic capacitor were studied. At least 70% of the crystal grains had regions with rare earth element solid solution occupying 5 to 70% of the cross section and the regions free of rare earth element solid solution occupying 10 to 80% of the periphery of the cross-section. Moreover, the average rare earth element concentration inside the crystal grains was half or less than half that at the grain boundaries.

TABLE 4

| EXAMPLES | Dielectric constant | Capacitance-temperature characteristics | | | | No. of defective samples in high-temperature load test | |
|---|---|---|---|---|---|---|---|
| | | 20° C. | | 25° C. | | | |
| | | −25° C. | 85° C. | −55° C. | 125° C. | 8 kV/mm | 14 kV/mm |
| 3-1 | 2800 | 0.8 | −6.8 | 1.5 | −11.6 | 0/100 | 0/100 |
| 3-2 | 2950 | 1.1 | −7.6 | 0.9 | −10.7 | 0/100 | 0/100 |
| 3-3 | 2790 | 0.7 | −6.9 | 1.4 | −13.6 | 0/100 | 0/100 |
| 3-4 | 2750 | 0.8 | −6.8 | 1.5 | −13.5 | 0/100 | 0/100 |
| 3-5 | 2760 | 0.9 | −6.7 | 1.6 | −13.4 | 0/100 | 0/100 |
| 3-6 | 2630 | 2.1 | −6.6 | 1.9 | −11.8 | 0/100 | 0/100 |
| 3-7 | 2430 | 0.9 | −6.7 | 1.6 | −11.5 | 0/100 | 0/100 |
| 3-8 | 2750 | 0.2 | −8.5 | 0 | −13.7 | 0/100 | 0/100 |
| 3-9 | 2700 | 0.6 | −7 | 1.3 | −13.7 | 0/100 | 0/100 |
| 3-10 | 2690 | 1 | −6.6 | 1.7 | −11.4 | 0/100 | 0/100 |
| 3-11 | 3010 | 0.3 | −6.1 | 1.3 | −10.9 | 0/100 | 0/100 |
| 3-12 | 2550 | 0.1 | −8.6 | −0.1 | −13.8 | 0/100 | 0/100 |
| 3-13 | 3230 | 1.2 | −7.5 | 1 | −12.7 | 0/100 | 0/100 |

Table 4 shows that the monolithic ceramic capacitors of EXAMPLES 3-1 to 3-13 exhibit high dielectric constant, superior capacitance-temperature characteristics, and high reliability under high-temperature load.

What is claimed is:

1. A dielectric ceramic comprising:
   $ABO_3$ as the main component, wherein A represents barium or a combination thereof with at least one of calcium and strontium, and B represents titanium or a combination thereof with at least one of zirconium and hafnium; and
   a rare earth element,
   wherein at least about 70% of crystal grains of the dielectric ceramic have a cross-section in which a first region containing dissolved rare earth element occupies about 5 to 70% of the area of the cross section and a second region free of the dissolved rare earth element occupies about 10 to 80% of the periphery of the cross-section.

2. The dielectric ceramic according to claim 1, wherein the dielectric ceramic comprises crystal grains and grain boundaries, and the average concentration of the rare earth element inside the crystal grains is about half or less than half the average concentration of the rare earth element at the boundaries.

3. The dielectric ceramic according to claim 2, wherein the ceramic is a particulate having an average particle diameter of about 0.05 to 0.7 µm.

4. The dielectric ceramic according to claim 3, further comprising at least one of manganese, nickel, iron, copper, magnesium, aluminum, chromium and vanadium.

5. The dielectric ceramic according to claim 4, further comprising a sintering aid comprising at least one of silicon, boron and lithium.

6. The dielectric ceramic according to claim 5, the rare earth element is about 0.5 to 5 mol % of the combination of $ABO_3$ and rare earth element.

7. The dielectric ceramic according to claim 1, wherein the ceramic is a particulate having an average particle diameter of about 0.05 to 0.7 µm.

8. The dielectric ceramic according to claim 1, further comprising at least one of manganese, nickel, iron, copper, magnesium, aluminum, chromium and vanadium.

9. The dielectric ceramic according to claim 1, further comprising a sintering aid comprising at least one of silicon, boron and lithium.

10. The dielectric ceramic according to claim 1, the rare earth element is about 0.5 to 5 mol % of the combination of $ABO_3$ and rare earth element.

11. A method for making the dielectric ceramic of claim 1, comprising:
providing $ABO_3$ aggregates each comprising a plurality of particles, wherein A represents barium or a combination thereof with at least one of calcium and strontium, and B represents titanium or a combination thereof with at least one of zirconium and hafnium,
providing a compound of a rare earth element;
blending the $ABO_3$ aggregates with the compound and calcining the resulting mixture so that the rare earth element diffuses and dissolves in surface regions of the $ABO_3$ aggregates to prepare a calcined powder; and
sintering the calcined powder.

12. The method of claim 11, wherein the provided $ABO_3$ aggregates comprise about four to nineteen particles.

13. The method according to claim 12, further comprising comminuting the calcined powder into particles prior to the sintering.

14. The method according to claim 13, wherein the comminuting is such that at least about 70% of the resulting crystal grains have a cross-section in which a first region containing dissolved rare earth element occupies about 5 to 70% of the area of the cross-section and a second region free of the dissolved rare earth element occupies about 10 to 80% of the periphery of the cross-section.

15. The method according to claim 14, wherein the comminuting is such that the sintered powder comprises particles having an average diameter of about 0.05 to 0.7 µm.

16. The method according to claim 15, further comprising preparing, prior to the blending, the $ABO_3$ aggregates such that most of the aggregates comprise about four to nineteen particles.

17. The method according to claim 11, further comprising comminuting the calcined powder into particles prior to the sintering such that at least about 70% of the resulting crystal grains have a cross-section in which a first region containing dissolved rare earth element occupies about 5 to 70% of the area of the cross section and a second region free of the dissolved rare earth element occupies about 10 to 80% of the periphery of the cross-section.

18. The method according to claim 17, wherein the comminuting the calcined powder is into particles having an average diameter of about 0.05 to 0.7 µm.

19. A monolithic ceramic capacitor comprising:
a composite comprising a plurality of dielectric ceramic layers and at least two internal electrodes disposed along the interfaces of different pairs of dielectric ceramic layers; and
external electrodes disposed on outer surfaces of the composite and electrically connected to particular internal electrodes,
wherein the dielectric ceramic layers comprise the dielectric ceramic of claim 1.

20. A monolithic ceramic capacitor according to claim 19, wherein the dielectric ceramic layers have a thickness of about 5 µm or less.

* * * * *